United States Patent
Dawoud et al.

(10) Patent No.: US 8,544,293 B2
(45) Date of Patent: Oct. 1, 2013

(54) VACUUM SORPTION APPARATUS

(75) Inventors: Belal Dawoud, Winterberg (DE); Peter Hoefle, Heppenheim (DE); Andreas Bornmann, Burgwald (DE); Stefanie Chmielewski, Frankenberg (DE); Christoph Marburger, Bad Berleburg (DE)

(73) Assignee: Viessmann Werke GmbH & Co. KG, Allendorf (DE)

( * ) Notice: Subject to any disclaimer, the term of this patent is extended or adjusted under 35 U.S.C. 154(b) by 174 days.

(21) Appl. No.: 13/134,929

(22) Filed: Jun. 21, 2011

(65) Prior Publication Data
US 2011/0283735 A1 Nov. 24, 2011

Related U.S. Application Data

(63) Continuation of application No. PCT/DE2010/001479, filed on Dec. 16, 2010.

(51) Int. Cl.
*F25B 15/00* (2006.01)

(52) U.S. Cl.
USPC .............................................. 62/476; 62/483

(58) Field of Classification Search
USPC ............................. 62/476, 478, 479, 483, 485
See application file for complete search history.

(56) References Cited

U.S. PATENT DOCUMENTS

| | | | |
|---|---|---|---|
| 2,363,381 A * | 11/1944 | Anderson, Jr. | 62/475 |
| 2,374,232 A * | 4/1945 | Pfeiffer et al. | 34/80 |
| 2,393,630 A * | 1/1946 | Grossman | 62/497 |
| 2,432,978 A * | 12/1947 | Anderson, Jr. | 62/103 |
| 2,654,229 A * | 10/1953 | Shagaloff et al. | 62/148 |
| 2,685,781 A * | 8/1954 | Simpson | 62/489 |
| 2,685,782 A * | 8/1954 | Anderson, Jr. | 62/487 |
| 3,828,575 A * | 8/1974 | Malcosky et al. | 62/476 |
| 4,739,631 A | 4/1988 | Paeye | |
| 5,440,896 A * | 8/1995 | Maier-Laxhuber et al. | 62/269 |
| 5,628,205 A * | 5/1997 | Rockenfeller et al. | 62/480 |
| 5,881,573 A * | 3/1999 | Ebbeson | 62/480 |
| 6,415,625 B1 * | 7/2002 | Rockenfeller et al. | 62/476 |
| 7,251,955 B2 * | 8/2007 | Henning | 62/480 |

FOREIGN PATENT DOCUMENTS

| | | |
|---|---|---|
| DE | 710 916 | 9/1941 |
| DE | 36 25 247 | 2/1987 |
| DE | 10 2004 049 408 | 4/2006 |
| DE | 10 2008 006 420 | 5/2009 |
| EP | 2 083 231 | 7/2009 |

OTHER PUBLICATIONS

International Search Report in PCT/DE2010/001479, Dec. 21, 2011.

* cited by examiner

*Primary Examiner* — Mohammad M Ali
(74) *Attorney, Agent, or Firm* — Collard & Roe, P.C.

(57) ABSTRACT

A vacuum sorption apparatus includes a first volume region (1) in which a sorber (2) which periodically sorbs or desorbs a refrigerant and a condenser (3) are located, and a second volume region (4) located below the first, in which an evaporator (5) is located, wherein a separating body (6) is located above the evaporator (5) to minimize a free surface area of the liquid refrigerant. The separating body (6) is configured to be vertically movable to compensate for different filling level heights of the refrigerant.

10 Claims, 1 Drawing Sheet

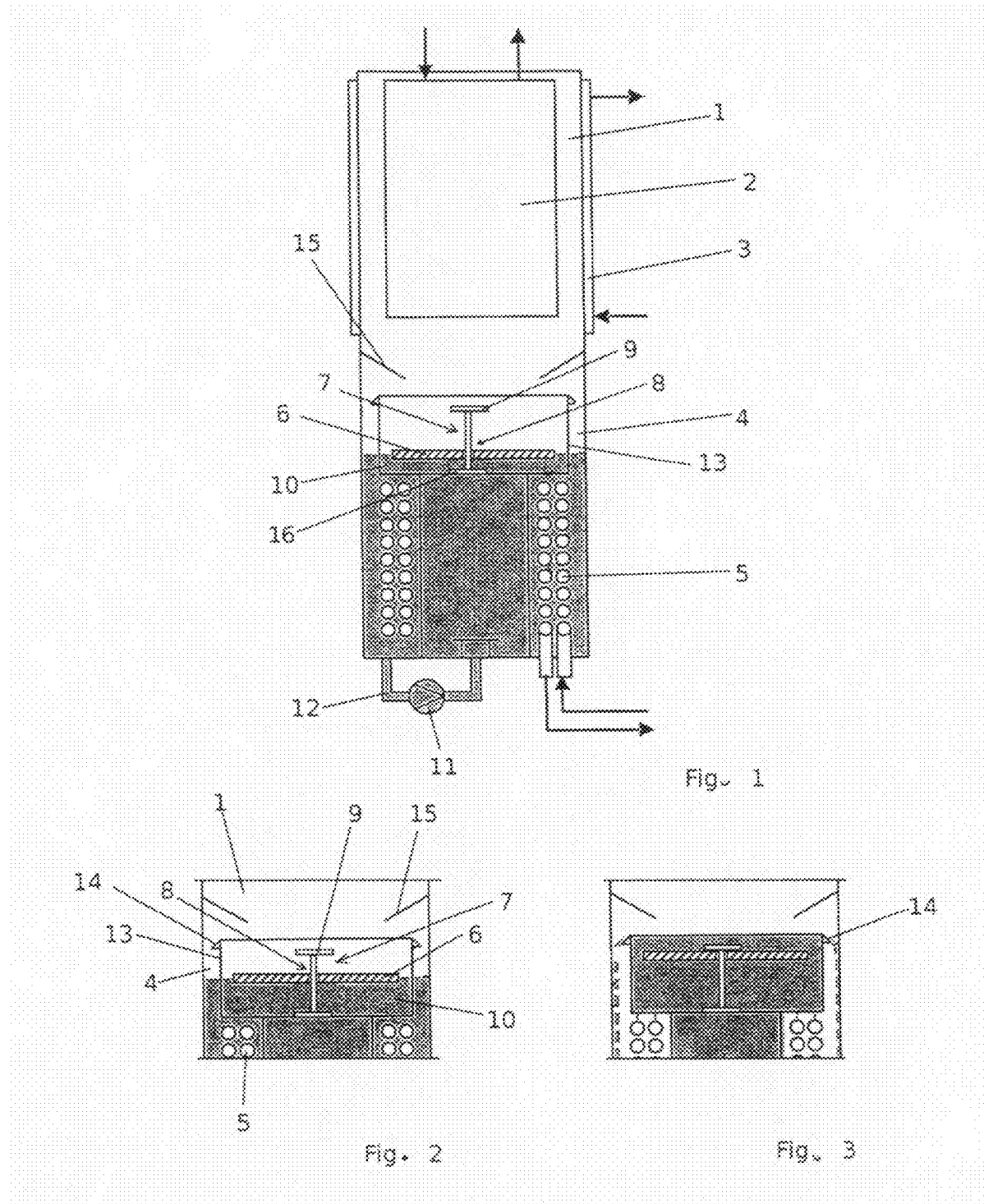

VACUUM SORPTION APPARATUS

CROSS REFERENCE TO RELATED APPLICATIONS

Applicants claim priority under 35 U.S.C. §119 of German Application No. 10 2009 060 005.1 filed Dec. 21, 2009. Applicants also claim priority and this application is a continuation under 35 U.S.C. §120 of International Application No. PCT/DE2010/001479 filed Dec. 16, 2010, which claims priority under 35 U.S.C. §119 of German Application No. 10 2009 060 005.1 filed Dec. 21, 2009. The international application under PCT article 21(2) was not published in English. The disclosures of the aforesaid International Application and German Application are incorporated herein by reference.

BACKGROUND OF THE INVENTION

1. Field of the Invention

The invention relates to a vacuum sorption apparatus.

2. The Prior Art

A vacuum sorption apparatus of the type specified initially is known from DE 10 2008 006 420 B3. Reference is made to the corresponding description of the function in its full extent. This sorption apparatus consists of a first volume region in which a sorber (for example, zeolite) which periodically sorbs or desorbs a refrigerant (for example, water) and a condenser are located, and a second volume region located below the first, in which an evaporator is located, wherein a separating body is located above the evaporator to minimize the free surface area of the liquid refrigerant. In this solution, the separation between the condenser and the evaporator installation space, expressed more specifically, is achieved by the evaporator installation space being flooded with refrigerant during the desorption phase and the refrigerant surface in combination with a displacement body (separating body) forms an insulating layer which prevents refrigerant vapor from condensing in the evaporator. The displacement body in this case consists of a good thermal insulator and the difference between the cross-sectional area of the displacement body and the evaporator installation space is as small as possible in order to minimize the condensation of refrigerant on the free refrigerant surface. The refrigerant accumulating during desorption is collected in the annular gap between displacement body and module shell.

SUMMARY OF THE INVENTION

It is the object of the invention to further develop a vacuum sorption apparatus of the type specified initially.

This object is achieved with a vacuum sorption apparatus of the type specified initially by the features according to the invention.

According to the invention, it is therefore provided that the separating body is configured to be vertically movable to compensate for different fill level heights of the refrigerant.

In other words, it is particularly preferably provided according to the invention that the displacement body or the separating body is configured to be floating on the refrigerant surface during the desorption phase. It is thereby achieved that in the desorption phase regardless of the operating point and the quantity of filled refrigerant, an optimal separation between condenser or sorber installation space (first volume region) and evaporator installation space (second volume region) is always formed or exists. In particular after standing times of the sorption module, the efficiency in the first cycle is increased since the separation exists regardless of a design point.

For a better understanding of the invention, it should be borne in mind that the cross-sectional area of the remaining annular gap should be configured to be as small as possible, in the case of a rigid separating body, it follows that the height of the entire module must be extended substantially in order to be able to receive the maximum converted amount of refrigerant. As a result, due to space limits are imposed on the crucial performance increases of the heat pump module. Due to the floating arrangement of the separating body according to the invention, the height thereof can be reduced substantially because the desorbed refrigerant no longer needs to be received in the annular gap between module wall and displacement body, which leads to a substantial reduction of the height of the entire module depending on the power rating and therefore the refrigerant conversion of the sorption module.

It should further be noted that due to a rigid arrangement of the displacement body in its vertical position, it is absolutely essential to determine the precise quantity of the required refrigerant which is technically difficult to implement due to production-dependent tolerances, in particular in the volume of the evaporator installation space and in the quantity of the sorption agent. Particularly if the amount of refrigerant is too small, it can occur in the conventional prior art that the refrigerant surface lies below the displacement body which results in losses of efficiency. Due to the solution according to the invention, such production- and application-dependent tolerances relating to the quantity or the filling level of the refrigerant can be compensated, which always ensures a proper and efficient function of the heat pump module.

Other advantageous further developments are discussed below.

For the sake of completeness, reference is also made to DE 10 2004 049 408 B4 in which, however, no separating body is provided for minimising the free surface of the liquid refrigerant but a blocking member is provided between the two volume regions.

BRIEF DESCRIPTION OF THE DRAWINGS

The vacuum sorption apparatus according to the invention including its advantageous further developments discussed below will be explained in detail hereinafter with reference to the diagrammatic representation of an exemplary embodiment.

In the figures

FIG. 1 shows in sectional view the vacuum sorption apparatus according to the invention with movable separating body at the beginning of the desorption phase;

FIG. 2 shows in partial sectional view the vacuum sorption apparatus according to FIG. 2 at the end of the desorption phase and FIG. 3 shows in partial sectional view the vacuum sorption apparatus according to FIGS. 2 and 3 during the sorption phase.

DETAILED DESCRIPTION OF PREFERRED EMBODIMENTS

The vacuum sorption apparatus shown in FIG. 1 comprises a first volume region 1, in which a sorber 2 (here, for example, zeolite) which periodically sorbs or desorbs a refrigerant (here, for example, water) and a condenser 3 (as the shell space surrounding the sorber 2) are located, and a second volume region 4 located below the first, in which an evaporator 5 (configured here as a double helical tube) is located, wherein a separating body 6 is located above the evaporator 5 to minimize the free surface area of the liquid refrigerant.

As in the aforementioned prior art, the separating body 6 is located in a transition region between the first and second volume region 1, 4, wherein the separating body 6 has a horizontal cross-sectional area, which is configured to be smaller than a cross-sectional area of the transition region.

It is now essential for the vacuum sorption apparatus according to the invention, and this applies to all embodiments, that the separating body 6 is configured to be vertically movable to compensate for different fill level heights of the refrigerant. It is particularly preferably provided, as shown, that the separating body 6 is configured to be floating on a free surface of the liquid refrigerant and to this end is formed from a material having a lower density than the refrigerant since this criterion ensures an almost automatic adaptation of the separating body 6 to the respective fill level height.

In order that the separating body 6 cannot execute any undesired horizontal movement, a guide element 7 is provided for the vertical guidance of the separating body 6. This is particularly preferably configured, and as shown in FIGS. 1 to 3, as a vertically oriented guide rod, wherein the separating body 6 is connected to the guide element 7, limited by a stop, between an upper and a lower position. To this end, a stop 9 for the separating body 6 is located in particular at the end of the guide rod facing away from the evaporator, an access opening 8 for the guide rod being further provided on the separating body 6.

As in the aforementioned prior art, in the preferred embodiment shown of the vacuum sorption apparatus according to the invention, a third volume region 10 is also provided, which is fluidically connected to the second volume region 4 to receive refrigerant via a connecting line 12 provided with a pump 11 and which has at least one opening for dispensing refrigerant to the second volume region 4, wherein the third volume region 10 has a sufficient volume size for at least partial release of refrigerant of the evaporator 5 and wherein a guide element 15 which guides the refrigerant directly or indirectly to the opening as desired is located between the first and second volume region 1, 4.

Furthermore, the separating body 6 is located in a container 13 which has the opening and which at least partly forms the third volume region 10. According to the invention, it is furthermore provided that the guide element 7 for the separating body 6 is located in the container 13.

In addition, in the region of location of the separating body 6 the container 13 has a horizontal cross-sectional area which is configured to be greater than that of the separating body 6 but smaller than that of the transition region.

Further, the container 13 has at least one refrigerant overflow 14 which is configured to point into an evaporator-free region of the second volume region 4.

According to FIGS. 1 to 3, the third volume region 10 is located completely inside the second volume region 4. With reference to the aforesaid prior art (DE 10 2008 006 420 B3—see FIGS. 9 to 14), the third volume region 4 in the solution according to the invention can however also be arranged at least partially outside the second volume region 4.

It is also particularly preferably provided that the third volume region 4 is located at least partially above the evaporator 5, wherein at the center of the evaporator 5 configured as a helical tube, there is provided a free space which is filled at least partially by the third volume region 4.

As is deduced from the preceding description, it is proposed according to the invention that the displacement body (separating body 6), which according to DE 10 2008 006 420 B3 terminates the evaporator installation space (second volume region 4) together with the refrigerant surface, is configured in such a manner that this floats on the refrigerant surface. In this case, as mentioned, the displacement body, which is provided with a surface pointing away from the refrigerant, is locked against horizontal movements by a centrally arranged centering bolt (guide rod). The vertical movement is restricted downwards by the base of the third volume region 10 or the stop 16 shown or upwards by a stop 9. The freedom of movement is on the one hand adapted to the maximum refrigerant conversion in the sorption process; on the other hand uncertainties in the production of the sorption module can be compensated by the vertical play. These would be, for example: variations in the quantity and the quality of the sorbent used, manufacturing tolerances relating to the height and the diameter of the evaporator 5, the collecting container (container 13) or the displacement body itself, or variations in the quantity of refrigerant used.

The evaporator 5 should be designed so that sufficient refrigerant can be poured in so that at no time does the displacement body rest on the bottom of the third volume region 10, which is furthermore ensured by the stop 16 shown (spacer disk or similar). The additional amount of refrigerant to be taken into account for this purpose must, as already mentioned, be taken up by the vertical freedom of movement of the displacement body.

The centering bolt (guide element 8) with the upper stop 9 has the task of fixing the separating element in its position during transport and during the sorption phase when the trickle pump (pump 11) is running and the refrigerant level reaches as far as the upper edge of the third volume region 10 in order to prevent any tilting or slippage of the separating body 6 which would have the result that its function would no longer be given.

Finally, it is advantageously provided (but not additionally shown) that the upper side of the separating body 6 has an approximately mushroom-shaped, conical, spherical or the like outer contour. Along with a surface pointing away from the refrigerant, which can also be provided, such a contour ensures that at no time does the refrigerant collect on the (upper) surface of the separating body 6, which would result in a deterioration of the efficiency.

In a further variant (also not shown additionally), the centering bolt (guide rod or the guide element) can be firmly connected to the separating body 6 towards the bottom or be located below (evaporator side) the separating body 6, the stop then being located in the flooded part of the evaporator with the result that the guide and stop structure need not be heated or cooled during the sorption process, which further favors the efficiency of the module.

REFERENCE LIST

1 First volume region
2 Sorber
3 Condenser
4 Second volume region
5 Evaporator
6 Separating body
7 Guide element
8 Access opening
9 Stop
10 Third volume region
11 Pump
12 Connecting line
13 Container
14 Refrigerant overflow

15 Guide element
16 Stop

What is claimed is:

1. Vacuum sorption apparatus comprising a sorber and a condenser located in a first volume region, wherein said sorber periodically sorbs or desorbs a refrigerant, and an evaporator located in a second volume region located below the first volume region, wherein a separating body is located above the evaporator and minimizes a free surface area of the liquid refrigerant, wherein the separating body is configured to be vertically movable to compensate for different filling level heights of the refrigerant.

2. The vacuum sorption apparatus according to claim 1, wherein the separating body is configured to be floating on a free surface of the liquid refrigerant.

3. The vacuum sorption apparatus according to claim 1, wherein the separating body is formed from a material having a lower density than the refrigerant.

4. The vacuum sorption apparatus according to claim 1, wherein a guide element is provided for vertical guidance of the separating body.

5. The vacuum sorption apparatus according to claim 4, wherein the separating body is connected to the guide element limited by a stop between an upper and a lower position.

6. The vacuum sorption apparatus according to claim 4, wherein the guide element is formed from a vertically oriented guide rod.

7. The vacuum sorption apparatus according to claim 6, wherein an access opening for the guide rod is provided on the separating body.

8. The vacuum sorption apparatus according to claim 6, wherein a stop for the separating body is located on the end of the guide rod facing away from the evaporator.

9. The vacuum sorption apparatus according to claim 1, further comprising a third volume region fluidically connected to the second volume region to receive refrigerant via a connecting line provided with a pump, wherein the third volume region has at least one opening for dispensing refrigerant to the second volume region, wherein the third volume region has a sufficient volume size for at least partial release of refrigerant of the evaporator.

10. The vacuum sorption apparatus according to claim 9, wherein the separating body is located in a container, wherein the container has the at least one opening and at least partially forms the third volume region, wherein the guide element for the separating body is located in the container.

* * * * *